United States Patent [19]
Halpern

[11] 3,720,708
[45] March 13, 1973

[54] 2-AMINO-2-(6-METHOXY-2-NAPHTHYL)-PROPIONIC ACID AND DERIVATIVES THEREOF

[76] Inventor: Otto Halpern, Palo Alto, Calif.

[22] Filed: Oct. 1, 1971

[21] Appl. No.: 185,912

Related U.S. Application Data

[62] Division of Ser. No. 77,733, Oct. 2, 1970, abandoned.

[52] U.S. Cl. .............. 260/519, 260/309.5, 260/520, 424/317
[51] Int. Cl. ................... C07c 101/04, C07c 101/12
[58] Field of Search ................................ 260/519

[56] References Cited

UNITED STATES PATENTS 3,574,704  4/1971  Classen et al. ..................... 260/519

Primary Examiner—Lorraine A. Weinberger
Assistant Examiner—Patrick J. Hagan
Attorney—Evelyn K. Merker et al.

[57] ABSTRACT

2-(6-Methoxy-2-naphthyl)propionic acid is prepared by treating a compound represented by the formula:

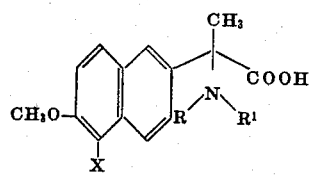

wherein X is hydrogen, bromo or chloro and each of R and $R^1$ is hydrogen and methyl, with palladium-on-charcoal, platinum oxide in an inert ogranic solvent under hydrogen or with Raney nickel in an inert organic solvent until 2-(6-methoxy-2-naphthyl)propionic acid is formed. The product has anti-inflammatory, analgesic and anti-pyretic activities.

3 Claims, No Drawings

2-AMINO-2-(6-METHOXY-2-NAPHTHYL)-PROPIONIC ACID AND DERIVATIVES THEREOF

This is a division of copending application Ser. No. 77,733 filed Oct. 2, 1970 now abandoned.

This invention relates to a process for preparing 2-(6-methoxy-2-naphthyl)propionic acid.

The process of this invention can be represented by the following formulas:

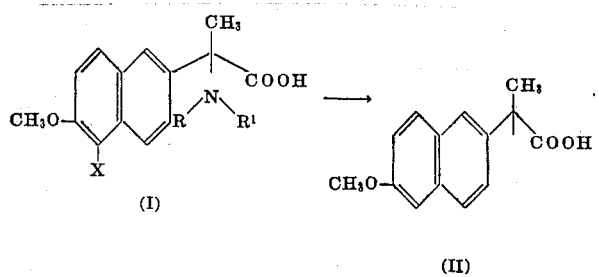

In the above formulas, X is chloro or bromo and each of R and $R^1$ is hydrogen or methyl.

One embodiment of the process of this invention comprises treating the compounds of Formula I with Raney nickel in an inert organic solvent until the compound of Formula II is formed, and separating the latter compound from the reaction mixture. Suitable inert organic solvents include lower alkanols, esters having up to six carbons such as ethyl acetate or a lower alkanoic acid such as acetic acid, optionally under hydrogen. The reaction is carried out at a temperature of at least 0°C and preferably above 20°C for from 10 minutes to 24 hours. Reflux temperature is most preferred.

Another embodiment of the process of this invention comprises treating compounds of Formula I with palladium-on-carbon platinum or platinum oxide in an inert organic solvent under hydrogen until the compound of Formula II is formed, and separating the latter compound from the reaction mixture. Suitable inert organic solvents include those described above for the treatment with Raney nickel. The reaction is carried out at a temperature of from 0°C up to below the reflux temperature of the solvent, room temperature being preferred, for from 10 minutes to 12 hours. The compound of Formula II is then separated from the reaction mixture by conventional procedures. For example, the reaction mixture can be mixed with water and then extracted with a suitable solvent such as ether or methylene chloride. The organic layer can then be separated, washed with water and evaporated to dryness. The residue can be purified by conventional techniques such as chromatography or recrystallization.

The preferred compound of Formula II is d 2-(6-methoxy-2-naphthyl)propionic acid. This can be obtained by employing the corresponding structural isomer of the compound of Formula I, whereby the product compound of Formula II is the corresponding isomer. Alternatively, the unresolved acid of Formula II can then be resolved by conventional procedures. For example, the unresolved compounds of Formula II can be resolved by selective biological degradation or by preparation of diastereo isomer salts thereof with a resolved optically active amine base such as cinchonidine and then separating the thus formed isomer salts by fractional crystallization. The separated isomer salts are then acid cleaved to yield the corresponding d 2-(6-methoxy-2-naphthyl)propionic acid.

The compounds of Formula II exhibit anti-inflammatory, analgesic and anti-pyretic activities and are accordingly employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-traumatic conditions and gout.

The compounds of Formula I can be prepared by a procedure represented as follows:

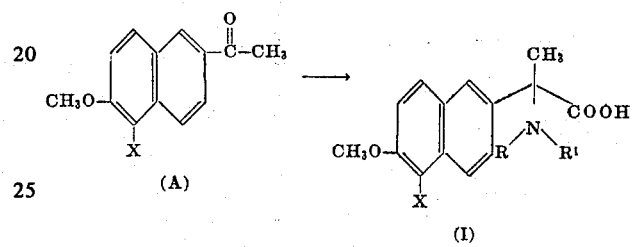

In the above formulas, X, R and $R^1$ are as previously defined.

In the above procedure, the known compounds of Formula A (1 mole) can be reacted with 2 molar equivalents of potassium cyanide in the presence of 4 molar equivalents of ammonium carbonate in an inert organic solvent. Suitable solvents include aqueous lower alkanol, preferably aqueous ethanol, ethylene glycol, ethanolamine or dioxane. The reaction is conducted at a temperature of about 60°C until the corresponding hydantoine is formed. The latter compound is then hydrolyzed in the presence of acid or base, preferably in the presence of base. The hydrolysis is preferably conducted at reflux temperature in the presence of a base such as barium or sodium hydroxide at reflux temperature in a solvent having an elevated boiling temperature such as diethylene glycol. After the hydrolysis, an excess of hydrochloric acid is added to precipitate the insoluble chlorohydrate of the amino acid of Formula I. The solid is removed, washed and redissolved in a lower alkanol, and the solution is adjusted to a pH of about 5 with ammonium hydroxide to precipitate the corresponding free amino acids of Formula I.

To prepare the substituted amines of Formula I, the unsubstituted amine is reacted with formaldehyde in the presence of formic acid to form the corresponding methylamino and dimethylamino compound, and the solvent phase is removed from the reaction mixture by evaporation in vacuo. The residue is then treated by conventional chromatography to separate the methyl and dimethyl substituted amino compounds, and the products are recrystallized from acetone-ethanol.

PREPARATION

A mixture of 20.4 g. of 2-acetyl-6-methoxynaphthalene, 185 ml. of ethanol, 125 ml. of water, 45.5 g. of ammonium carbonate and 13 g. of potassium cyanide is maintained with agitation for 19 hours at a temperature of 62°C. The solution is then evaporated to dryness in vacuo, and the residue is mixed with water and extracted with ether. The ether phase is evaporated to dryness, and the solids are recrystallized in ethyl acetate to yield 5-(6methoxynaphthyl)-5-methylhydantoine.

This compound in a mixture of 3 g. of sodium hydroxide and 30 ml. of water is maintained at a temperature of about 160° to 170°C for 4 hours, and the reaction mixture is then mixed with an excess of hydrochloric acid. The precipitate is separated from the resultant mixture by filtration, and redissolved in water. The resulting solution is adjusted with ammonium hydroxide to the isoelectric point of about pH 5, and the resultant precipitate is separated, washed with water and dried to yield 2-amino-2-(6-methoxy-2-naphthyl)propionic acid. A mixture of 2.2 g. of the latter compound, 4 ml. of formic acid and 2.5 ml. of a 40 percent solution of formaldehyde is heated at reflux for 40 minutes, and the reaction mixture is then evaporated to dryness in vacuo. The residue is then crystallized from acetone-hexane to yield 2-(6-methoxy-2-napthyl)-2-dimethylaminopropionic acid.

Repeating the above procedure with the corresponding 2-acetyl-5-halo-6-methoxynaphthalene yields the corresponding 5-halo compounds.

This invention is further illustrated by the following specific but non-limiting examples.

EXAMPLE 1

A solution of 1 g. of 2-amino-2-(6-methoxy-2-naphthyl)-propionic acid in 10 ml. of anhydrous methanol is mixed with 1 g. of Raney nickel and heated at reflux temperature for 12 hours. The mixture is filtered, and the filtrate is diluted with water. The precipitate is dried and recrystallized from acetone-hexane to yield 2-(6-methoxy-2-naphthyl)propionic acid.

Repeating the above procedure with the corresponding 5-chloro and 5-bromo compounds yields 2-(6-methoxy-2-naphthyl)propionic acid.

EXAMPLE 2

A solution of 1 g. of 2-amino-2-(6-methoxy-2-naphthyl)propionic acid in 10 ml. of anhydrous methanol is mixed with 100 mg. of palladium-on-charcoal and stirred at room temperature under a hydrogen atmosphere for 12 hours. The mixture is filtered, diluted with water and extracted with methylene chloride. The organic phase is evaporated to dryness, and the residue is recrystallized from methylene chloride-hexane to yield 2-(6-methoxy-2-naphthyl)propionic acid.

Repeating the above procedure with the corresponding 5-chloro and 5-bromo compounds yields the corresponding 2-(6-methoxy-2-naphthyl)propionic acid.

Repeating the above procedure but replacing palladium-on-charcoal with platinum or platinum oxide yields, in each instance, 2-(6-methoxy-2-naphthyl)propionic acid.

EXAMPLE 3

Repeating the procedure of Example 1 but replacing 2-amino-2-(6-methoxy-2-naphthyl)propionic acid with the stereospecific form corresponding to d 2-(6-methoxy-2-naphthyl)propionic acid, the latter named compound is obtained as the final product.

EXAMPLE 4

A solution of dl 2-(6-methoxy-2-naphthyl)propionic acid in methanol is prepared by dissolving 230 g. of the product of Example 1 in 4.6 l. of warm methanol. The resulting solution is boiled until it becomes turbid; then sufficient methanol is added to make the solution clear again. This hot solution is added to a solution of 296 g. of cinchonidine in 7.4 l. of methanol heated to about 60°C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 grams of the cinchonidine salt crystals are added to a stirred mixture of 600 ml. of ethyl acetate and 450 ml. of a 2 N aqueous hydrochloric acid. After the mixture has been stirred for 2 hours, the ethyl acetate layer is removed and washed with water to neutrality, dried over sodium sulfate and evaporated to yield d 2-(6-methoxy-2-naphthyl)propionic acid.

I claim:

1. A compound selected from the group of compounds represented by the formula:

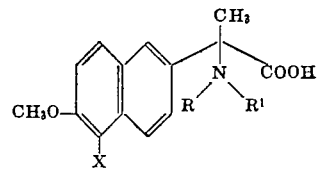

wherein X is chloro or bromo and each of R and $R^1$ is hydrogen or methyl.

2. As a compound of claim 1, 2-amino-2-(6-methoxy-2-naphthyl)-propionic acid.

3. As a compound of claim 1, 2-(6-methoxy-2-naphthyl)-2-dimethylaminopropionic acid.

* * * * *

UNITED STATES PATENT OFFICE
CERTIFICATE OF CORRECTION

Patent No. 3,720,708  Dated March 13, 1973

Inventor(s) Otto Halpern

It is certified that error appears in the above-identified patent and that said Letters Patent are hereby corrected as shown below:

Title page, [57] that portion of the formula reading:

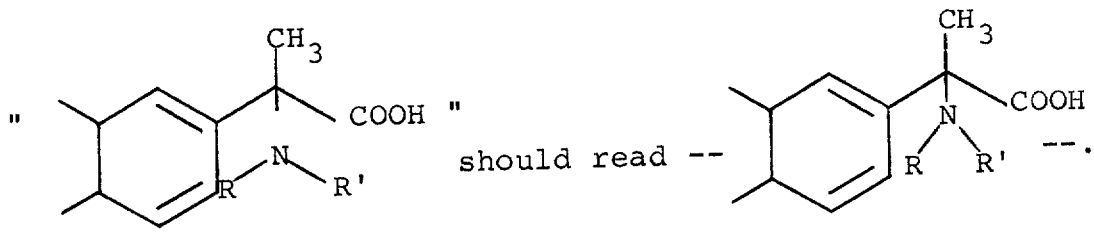

Title page, [57] line 5, -- platinum or -- should appear before "platinum oxide".

Column 1, lines 10 to 20 and Column 2, lines 20 to 25, that portion of Formula I reading

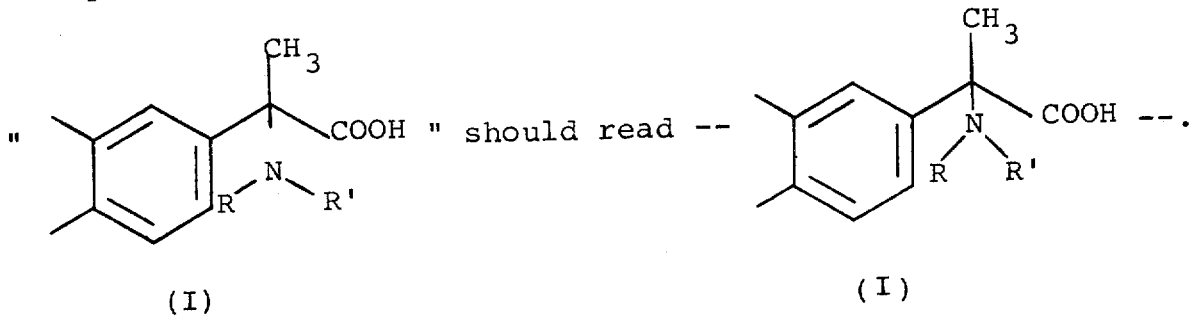

Signed and sealed this 25th day of December 1973.

(SEAL)
Attest:

EDWARD M. FLETCHER, JR.  RENE D. TEGTMEYER
Attesting Officer  Acting Commissioner of Patents